United States Patent

Rivers et al.

Patent Number: 5,934,648
Date of Patent: Aug. 10, 1999

[54] CARBON FIBER REINFORCED CARBON COMPOSITE VALVE FOR AN INTERNAL COMBUSTION ENGINE

[75] Inventors: H. Kevin Rivers, Hampton; Philip O. Ransone, Gloucester; G. Burton Northam, Carrollton, all of Va.

[73] Assignee: The United States of America as represented by the Administrator of the National Aeronautics and Space Administration, Washington, D.C.

[21] Appl. No.: 08/828,818

[22] Filed: Mar. 12, 1997

Related U.S. Application Data

[60] Provisional application No. 60/014,188, Mar. 13, 1996.

[51] Int. Cl.⁶ ..................................................... F01L 3/02
[52] U.S. Cl. ........................................ 251/368; 123/188.3
[58] Field of Search ........................... 251/368; 123/188.3

[56] References Cited

U.S. PATENT DOCUMENTS

| | | | |
|---|---|---|---|
| 3,983,900 | 10/1976 | Airhart | 251/368 |
| 3,994,319 | 11/1976 | Airhart | 251/368 |
| 4,653,726 | 3/1987 | Lung et al. | 251/368 |
| 4,683,809 | 8/1987 | Taylor . | |
| 4,736,676 | 4/1988 | Taylor . | |
| 4,881,500 | 11/1989 | Kojima et al. . | |
| 4,909,133 | 3/1990 | Taylor . | |
| 4,928,645 | 5/1990 | Berneburg et al. | 251/368 |
| 5,083,537 | 1/1992 | Onofrio et al. . | |
| 5,370,087 | 12/1994 | Guimond et al. . | |
| 5,441,235 | 8/1995 | Narasimhon et al.. | 251/368 |

FOREIGN PATENT DOCUMENTS

| | | |
|---|---|---|
| 0 437 303 A3 | 3/1988 | European Pat. Off. . |
| 39 14262 A1 | 4/1989 | Germany . |
| 39 26431 A1 | 8/1989 | Germany . |
| 3-271510 | 3/1990 | Japan . |

*Primary Examiner*—A. Michael Chambers
*Attorney, Agent, or Firm*—Kurt G. Hammerle

[57] ABSTRACT

A carbon fiber reinforced carbon composite valve for internal combustion engines and the like formed of continuous carbon fibers throughout the valve's stem and head is disclosed. The valve includes braided carbon fiber material over axially aligned unidirectional carbon fibers forming a valve stem; the braided and unidirectional carbon fibers being broomed out at one end of the valve stem forming the shape of the valve head; the valve-shaped structure being densified and rigidized with a matrix of carbon containing discontinuous carbon fibers; and the finished valve being treated to resist oxidation. Also disclosed is a carbon matrix plug containing continuous and discontinuous carbon fibers and forming a net-shape valve head acting as a mandrel over which the unidirectional and braided carbon fibers are formed according to textile processes. Also disclosed are various preform valves and processes for making finished and preform carbon fiber reinforced carbon composite valves.

20 Claims, 5 Drawing Sheets

CARBON FIBER REINFORCED CARBON COMPOSITE VALVE FOR AN INTERNAL COMBUSTION ENGINE

CLAIM OF BENEFIT OF PROVISIONAL APPLICATION

Pursuant to 35 U.S.C. Section 119, the benefit of priority from provisional application 60/014,188, with a filing date of Mar. 13, 1996, is claimed for this non-provisional application.

ORIGIN OF THE INVENTION

The described invention was made by employees of the United States Government and may be manufactured and used by or for the Government for governmental purposes without the payment of any royalties thereon or therefor.

BACKGROUND OF THE INVENTION

1. Technical Field of the Invention

This invention relates to valves made of carbon fiber reinforced carbon composite materials, for use in internal combustion engines and the like.

2. Description of the Related Art

Current internal combustion engine valves are made from steel and other metals. Most are cast or forged, while some are machined from billets of metal. Metallic valves are heavy and have poor structural properties at higher temperatures. Due to their weight, metallic valves acquire substantial inertia as engine speed (revolutions per minute or "RPM") increases and overwhelm's the valve spring's capabilities, thus limiting the engine's ability to reach higher RPM where more power can be produced. The high levels of friction resulting from conventional steel valve trains also adversely limits engine speed. Furthermore, the temperature restrictions inherent in metallic valves limit engine efficiencies and emissions reductions possible at higher temperatures. These combustion efficiencies and emissions could be improved if exhaust gas temperatures could be raised beyond the current 1500 to 1750 degree Fahrenheit limit of metallic valves. In summary, power losses due to valve spring load and valve-train friction, and inefficiencies and emissions due to exhaust valve temperature limitations, could be significantly reduced if valves were lighter and able to operate at higher temperatures.

Engineers have devoted considerable thought to the goal of finding valve materials that are light and capable of operating reliably at very high temperatures. One such material is titanium, which has long been used to make valves for racing engines. Titanium valves are about half the weight of steel valves and are capable of operating at higher temperatures. However, the high cost of titanium valves make them unsuitable for wider use. A newly devised valve material, titanium aluminide, has shown promise. Titanium aluminide valves are even lighter than current titanium valves and may have some of their high temperature abilities as well. But as with titanium valves, the titanium aluminide material is expensive and the process used to make valves from it is cumbersome.

A non-metallic material proposed for valves is ceramics. Ceramics can be lighter than metals and can operate at higher temperatures. However, ceramic valves presented thus far have been brittle, subject to thermal shock, and prone to catastrophic failure. A prior invention, U.S. Pat. No. 4,928,645, "Ceramic Composite Valve for Internal Combustion Engines and the Like", consists of a fiber reinforced ceramic material designed to counteract the brittleness characteristic of high temperature ceramics. This design shows a carbon fiber reinforcing woven sleeve over unidirectional carbon fiber tows forming a valve stem, onto which a ceramic valve head, containing discontinuous fibers, is molded. This design does not show continuous fibers forming the valve stem and the valve head, but teaches a valve formed of two parts: (1) a stem formed of continuous fibers, and (2) a head formed of ceramic material and containing discontinuous fibers and molded onto the stem. This design is inherently weak and, in practice, prone to catastrophic failure, owing to the lack of continuous fibers throughout the valve, from the stem to the head. Also, because the valve uses both continuous and discontinuous fibers, it is difficult to manufacture. Moreover, so far, the use of ceramic valve materials has not proven successful in internal combustion engines.

The advantage of the presently disclosed invention is that carbon fibers are continuous throughout the valve, forming both the stem and the head in one continuous piece, making it stronger and stiffer and less prone to catastrophic failure. Moreover, since the disclosed invention is formed from continuous fibers throughout, it may be manufactured in quantity more easily. Finally, the disclosed invention is lighter, stronger, and can operate under higher temperatures than prior art valves.

SUMMARY OF THE INVENTION

Accordingly, one object of the present invention is to provide a carbon fiber reinforced carbon composite ("CFRCC") valve, for internal combustion engines and the like, that is formed from continuous carbon fibers.

Another object is to provide a CFRCC valve that is light weight.

Another object is to provide a CFRCC valve that is strong.

Another object is to provide a CFRCC valve that is capable of operating at high temperatures.

Another object is to provide a CFRCC valve that is oxidation resistant.

Another object is to provide a CFRCC valve that is simple and cost-effective to manufacture in quantity.

According to the present invention, the foregoing objects and advantages are obtained by providing a valve for internal combustion engines and the like that is formed from composite material containing continuous carbon fibers throughout. Such a CFRCC valve, formed from a carbon matrix material reinforced by continuous carbon fibers, will have significantly less mass than steel valves and also less mass than titanium and titanium aluminide valves.

Carbon fiber reinforced carbon matrix composites are composed of carbon fibers embedded in a carbonaceous matrix. Although the fibers and matrix are both made of carbon, this does not homogenize the mechanical behavior of the composite because the state of the micro-structure may range from carbon to graphite. Graphite consists of tightly bonded, hexagonally arranged carbon layers. The hexagonal bonds are extremely strong, but the layers are held together by weak van der Waals forces. But, carbon can also take a number of quasi-crystalline forms, ranging from an amorphous or turbostratic glassy carbon to the highly crystalline graphite and even to the strongest diamond structure. This anisotropy of the graphite single crystal encompasses many structural forms of carbon. It ranges in the degree of preferred orientation of the crystallites and influences porosity. In CFRCC's the range of properties can extend to both fibers and the matrix. Using a variety of processing techniques, great flexibility exists in the design and properties that can be obtained from CFRCC's.

In general, fiber reinforced composites have the advantages of high specific strength, stiffness, and in-plane toughness. CFRCC's combine these advantages with the refractory properties of structural ceramics. Thus, CFRCC's retain these mechanical advantages as well as high thermal stability and resistance to thermal shock and chemical stability, superior to any other material. Owing to this, CFRCC's are not brittle and prone to catastrophic failure, as ceramics are. These properties of CFRCC's may be tailored to a unique application by specifying the orientation of continuous fibers and by the use of additives or treatments applied to the fibers or matrix.

CFRCC's were initially developed for high temperature, high pressure, and high load aerospace applications, and they are currently used in this field as heat-shields and rocket nozzles. In recent years, these materials have found many uses both inside and outside of aerospace, such as in exotic and racing car chassis structures, brakes, clutches, and wheels.

The use of CFRCC's for internal combustion engines has been proposed as a means to reduce overall engine weight as well as the mass of individual engine parts. Since CFRCC's may operate at much higher temperatures than conventional metal components, thermal efficiencies and emissions can be significantly improved. Because CFRCC's are inherently porous, various degrees of self-lubrication can be imparted to engine parts by controlling the graphitization of the composite materials and by following special processing procedures. In the case of valves, for example, lubricating oil is required to allow a metallic valve stem to slide in the valve guide. This results in some oil entering the combustion chamber and in turn disturbing the fuel and air mixture, leaving deposits on pistons, valve faces and combustion chambers, and increasing hydrocarbon emissions. By substituting CFRCC's valves and valve guides, it is possible to make these parts self-lubricating and to eliminate the need for oil in this area, thereby reducing emissions. These efficiencies are also aided by the very low thermal coefficient of expansion for CFRCC's. Since CFRCC's do not expand as much as equivalent metal parts, it is possible to run parts with much tighter tolerances, which results in better sealing and reduced oil passage into the combustion chamber.

CFRCC's may be manufactured according to traditional metallurgical processes, such as casting, molding, extruding, and pultruding, or they may be manufactured according to many other processes, such as well-developed textile processes like weaving and braiding. CFRCC's may be made in a wide variety of forms, from one-dimensional to n-dimensional, using unidirectional strands or "tows", tapes, woven cloth, or braided rope. Presently, many CFRCC structures are fabricated by hand and subjected to multi-step impregnation, densification, curing, and coating processes. However, as these materials have become more widely available, mechanized fabrication and single-step finishing processes are being developed which have significantly reduced the costs associated with CFRCC parts.

In internal combustion engine applications, CFRCC parts require anti-oxidation treatments when they are to operate at temperatures above 600 degrees Fahrenheit in the presence of oxygen. Anti-oxidation technology is well developed to satisfy aerospace applications. Ceramic coatings, such as silicon carbide or silicon nitride may be applied by chemical vapor deposition or sputtering, or catalytic coatings, such as nickel may be applied by electro plating. Other treatments impregnate the carbon fibers with liquid precursors, chemically modifying the carbon matrix, and treating the materials by chemical vapor infiltration. Adding borate glass-forming powders to chemically modify the carbon matrix material is also an effective and simple anti-oxidation treatment.

The CFRCC valve's greatest advantage is its reduced mass. Owing to this a CFRCC valve will acquire much less inertia at high RPM than a metallic valve. This reduction in inertia in turn reduces greatly the load carried by the valve spring. Spring loading prevents engines from exceeding a certain RPM for a given design, since above this ceiling the metallic valve will no longer be restrained by the spring, but will continue moving uncontrolled. Under these circumstances, the valve may come into contact with the piston, leading to possible catastrophic engine failure. Moreover, such an out of control valve will inhibit normal engine operation and will place enormous strain on the valve train components, leading to wear and possible failure. A lighter CFRCC valve allows controlled valve actuation at higher engine speeds where more power can be produced from a given engine. For this reason, to achieve more power from a given engine size, small engines and racing engines are designed to operate at higher RPM's. Thus, lighter valves make smaller, more fuel efficient engines able to achieve the same power as bigger, gas-guzzling engines. CFRCC valves may be made according to the present invention which are significantly less than half the weight of conventional steel valves.

A CFRCC valve is also able to operate at significantly higher temperatures. Low cost, commodity steel valves used in the overwhelming majority of internal combustion engines are limited to exhaust gas temperatures in the 1500 to 1750 degree Fahrenheit range. Combustion efficiencies could be improved and undesirable emissions reduced if engine exhaust gas temperatures could be raised beyond this level. Temperature performance of steel valves has been improved by metallurgical refinements and by hollow steel valve designs that permit the introduction of cooling materials inside the valve. Titanium and titanium aluminide valves will also operate at higher temperatures than conventional steel valves. However, the high cost of hollow steel, titanium and titanium aluminide valves have made them impractical for common use. By contrast, a CFRCC valve can operate safely up to at least 2500 degrees Fahrenheit and yet is simple in design and manufacture.

Valve tips are subject to loads, placed on them directly or indirectly from the camshaft during operation, that are as high as 2000 lbs. Such loads could cause CFRCC valve tips to mushroom. The presently disclosed invention includes a metallic cap capable of transferring these tip loads into the stem, thereby preventing mushrooming during operation.

Accordingly, the disclosed invention presents an internal combustion engine valve fabricated from continuous carbon fibers extending from the tip, through the stem and into the head. The most basic form of the invention uses braided carbon fiber rope material forming the valve stem and broomed-out or unraveled and extended radially at one end to form the valve head. In this way, the critical area where the stem meets the valve head contains strong, tightly bonded continuous carbon fibers. This feature is new to the field and distinguishes the present invention from the prior art composite valves which only have continuous fibers in the stem onto which a valve head-in lieu thereof is attached. The present invention contains a number of refinements to the basic feature of continuous carbon fiber valve. In one such embodiment of the present invention, unidirectional carbon fibers, or tows, are included axially in the stem and head. These unidirectional fibers add significant axial strength and stiffness. In another embodiment, these unidirectional carbon fibers are also broomed-out, along with the braided carbon fiber rope, to form the valve head.

In another embodiment, some or all of the braided carbon fiber material is broomed-out to form the head and then, around the circumference of the head, bent back toward the valve's axis and directed radially inward to form the valve's face. If less than all of the braided carbon fiber material is disposed this way, it forms a braided carbon fiber tube or casing over the carbon fiber material underneath. In this way, carbon fibers form the entire shape of the valve in a continuous form. Similarly, in another embodiment of the present invention, unidirectional carbon fibers are broomed-out to form the valve head and they too are bent around the head's circumference and directed radially back toward the valve's axis. In this way, both the braided carbon fiber rope and the unidirectional fibers are continuous not only throughout the valve stem and head, but also throughout the valve's face.

In another embodiment of the present invention, the braided carbon fiber rope and unidirectional fibers forming the valve are surrounded by a carbonaceous matrix, thereby filling voids in the fiber form and making the entire structure more dense and rigid. This densification process determines the composite's density and degree of stability and rigidity. Densification processing is carried out using gaseous (chemical vapor deposition), or liquid (resins or pitches), precursor materials. Each process involves treatment to the impregnants, ranges of temperatures and pressures, gas ratios, and process sequences. The objective is to fill voids in the carbon fiber structure with carbon matrix material. The matrix material may also be preimpregnated onto the carbon fibers. It may also be added by injection or molding. This carbonaceous matrix material fills out voids between the carbon fibers making up the valve. Moreover, in another embodiment, this carbonaceous matrix may also contain discontinuous carbon fibers to add strength.

In another embodiment of the present invention, the continuous carbon fibers are formed over a carbon matrix plug in the net shape of the valve head. This carbon matrix plug acts as a guide over which the carbon fibers are directed and provides bulk material in the valve head area where the continuous carbon fibers are broomed-out and therefore less dense. Also, by providing a net valve head shape, the plug becomes a mandrel over which the carbon fibers may be directly braided according to well-developed textile methods. In an additional embodiment, the carbon matrix plug may contain continuous or discontinuous carbon fibers, adding strength and stiffness to the plug and the final valve. It is further contemplated by this invention that the unidirectional carbon fibers along the axis of the valve may extend through the axis of the carbon matrix plug or may be directed over the outside of the plug.

In a further embodiment of the present invention, a process of making the disclosed valve is described. According to this process, a CFRCC valve is made from carbon fibers braided over a carbon matrix plug acting as a mandrel. This process may also incorporate unidirectional carbon fibers directed through a hole in the axis of the carbon matrix plug and/or directed over the plug. The carbon fibers may be preimpregnated with a carbon precursor. The net-shape valve formed by this process is manufactured according to textile processes. In this way, an unlimited number of net-shape valves are produced in a production line and individual net-shape valves are cut from this line. These net-shape CFRCC valves may then be placed in a mold. Once in a mold, additional carbonaceous matrix precursor material may be added or injected to fill voids. This net-shape valve may then be cured by the application of pressure and/or heat to provide a CFRCC valve preform that is finished or requires some machining.

In another embodiment of the present invention, anti-oxidation treatments are applied to the CFRCC valve. Such treatments include ceramic coatings such as silicon nitride and silicon carbide. Also contemplated by the present invention are catalytic coatings, such as nickel. Also contemplated by the present invention is the addition to the carbon fibers and/or carbon matrix material by chemical vapor infiltration of borate glass forming powders.

In another embodiment of the present invention, a metal cap is placed at the tip of the CFRCC valve stem to distribute tip loads directly or indirectly from an engine's camshaft into the stem. This cap will prevent the CFRCC valve tip from mushrooming under the repeated hammering of valve-train loads.

In an additional embodiment of the present invention, magnetic material, such as iron, is incorporated into the carbon matrix material so that the CFRCC valve may be actuated electronically rather than mechanically.

DETAILED DESCRIPTION OF THE INVENTION

Figure 1:
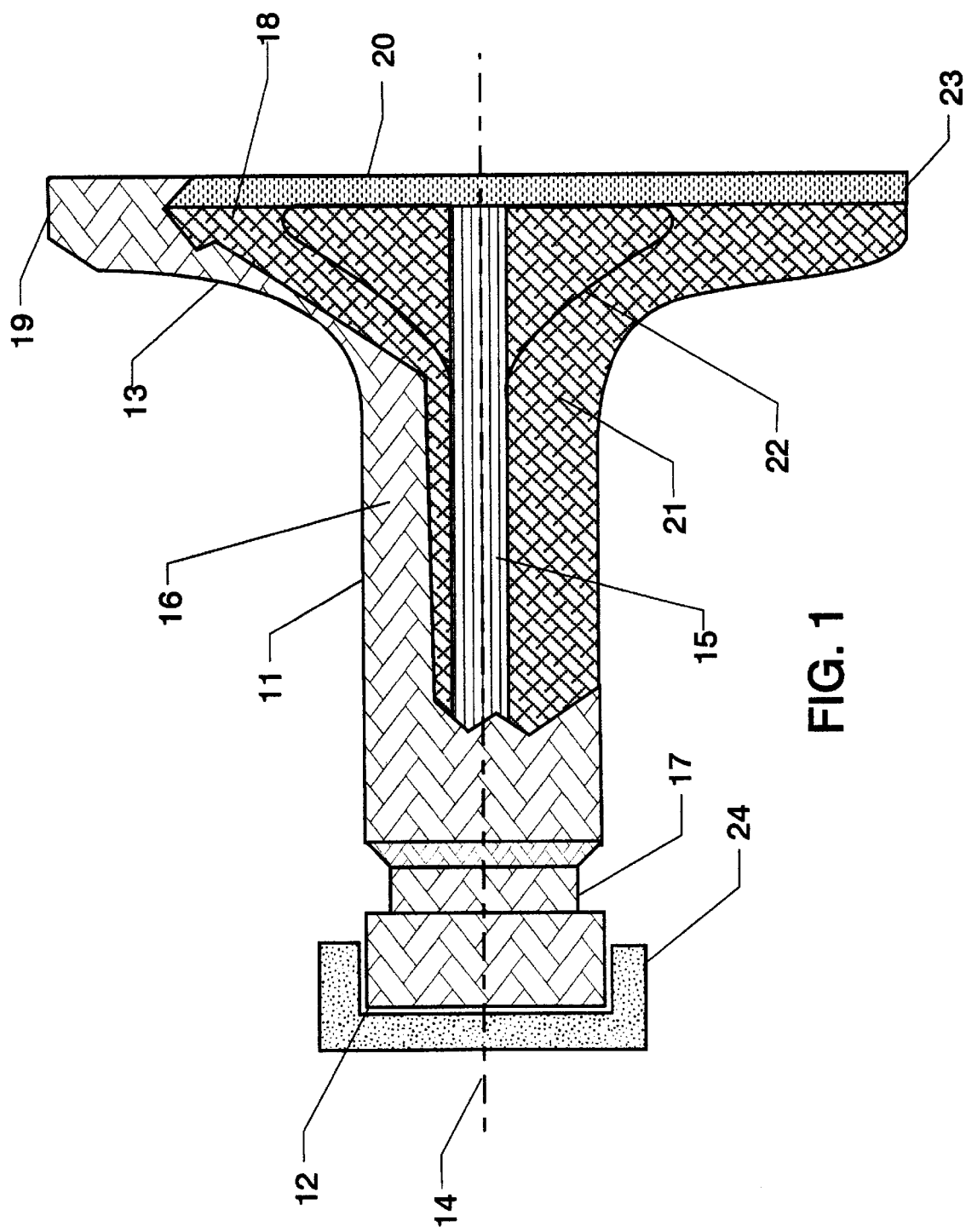
FIG. 1 is a partially sectioned side view of the valve fabricated according to the disclosed invention.

FIG. 1 shows a CFRCC finished valve or valve preform embodied by the disclosed invention. A valve preform embodied by this invention is an unfinished valve requiring machining or other work to make it suitable for operation. Both finished valves and valve preforms are contemplated by the disclosed invention. The valve has a stem (11), suitable for insertion in an engine's valve guide (not shown). One end of the stem terminates in a tip (12), which may accept valve opening forces directly or indirectly from an engine's camshaft (not shown). The other end of the stem is formed into a head (13), suitable for mating with the engine's valve seat (not shown). Along the axis (14) of the valve stem are axially aligned, unidirectional carbon fibers (15). Carbon fibers are presently manufactured as "tows", which are winds of individual strands of continuous carbon material. It is contemplated by this invention that the axially aligned, unidirectional carbon fibers could be formed of any type of continuous carbon material, including tows. But, they may also be formed from the individual strands of continuous carbon material that are presently used to make tows, or from any other continuous, unidirectional carbon material. Over the unidirectional carbon fibers (15) is braided carbon fiber material (16). Near the tip (12) of the valve, an indent may be formed, during the molding process or later by machining, to create a spring retainer seat (17). At the head end of the valve, the unidirectional carbon fibers

(15) and the braided carbon fiber material (16) are "broomed out" (shown generally at 18), to form the shape of the valve's head. These broomed out fibers (18) are bent over to form the outer circumference (19) of the head and directed radially toward the axis (14) of the valve, forming the valve's face (20). Voids in the material forming the valve, if any, in the head portion where the carbon fibers are less dense, or in the stem portion, may be filled with a carbon matrix material (shown generally at 21). This carbon matrix may contain discontinuous carbon fibers (22) for added strength. The carbon matrix may also have particles of magnetic material (not shown), such as iron, embedded within it. Over the face (20) of the valve, one or more laminar sheets of woven carbon fiber (23), may be bonded to add strength and temperature resistance to this portion of the valve. At the tip (12) end of the valve, a metallic cap (24), may be bonded or otherwise attached to transmit tip loads into the composite stem and to constrain the fibers at the stem from mushrooming. The carbon fibers used in forming the valve may be preimpregnated with carbon matrix precursor, or the basic valve form described above may be impregnated with carbon precursor, to further fill any voids. The valve is placed in a die or mold (not shown), and cured under pressure and heat. The valve form may be placed in a mold at various stages in the process described so far. For example, the valve may be formed from the outset in a mold, which would assist in constraining the carbon fibers in the stem portion (11) while the fibers in the head portion (13) are broomed out. Or, the valve may be placed in a mold immediately before it is cured. Or, it may be placed in a mold between these two times. After the valve is cured, it may be further carbonized, densified and machined, if necessary. After finishing, the valve may be treated to prevent oxidation during operation. Such treatment includes silicon carbide and silicon nitride ceramic coatings (not shown) applied by chemical vapor deposition or sputtering, or a nickel catalytic coating (not shown) applied by electroplating. Another such treatment would be the chemical vapor infiltration of a borate glass-forming powder into the carbon fibers and/or carbon matrix material (not shown).

Figure 2:
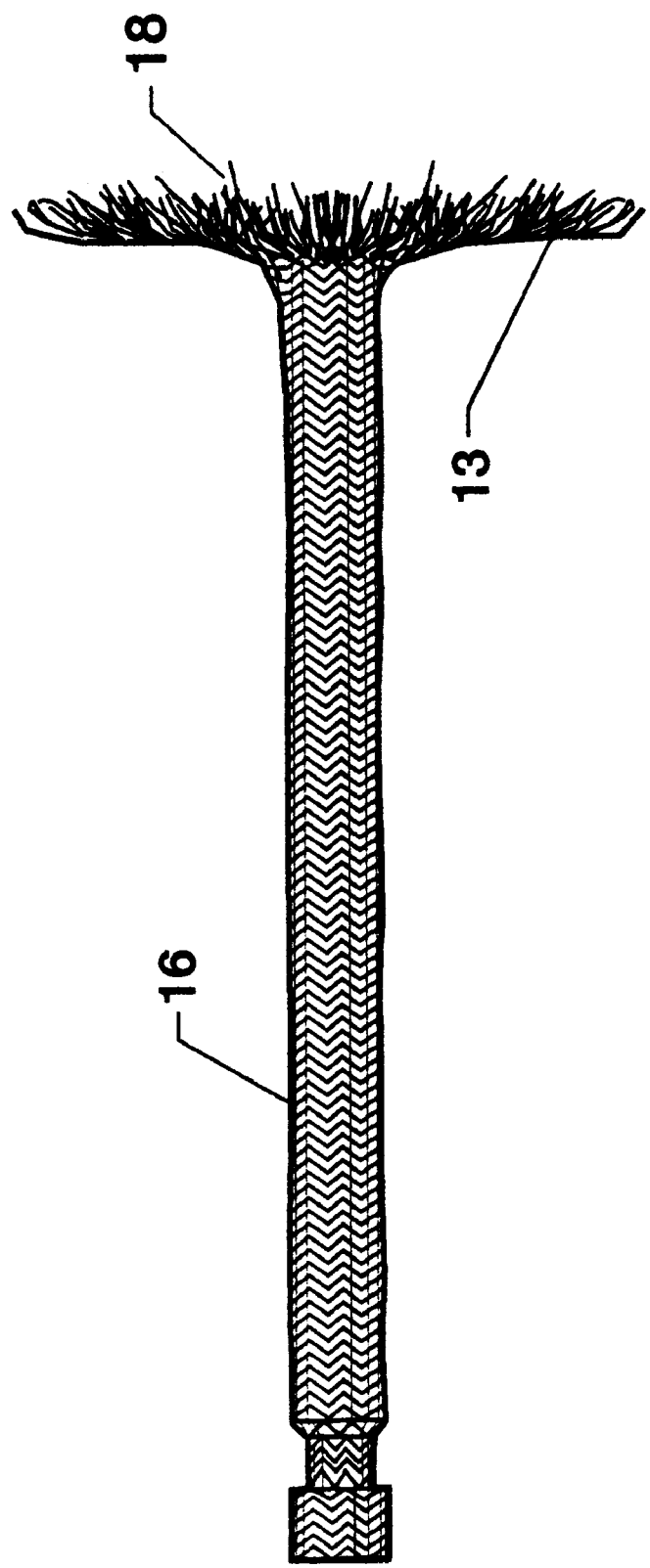
FIG. 2 is a side view of some embodiments of the valve fabricated according to the disclosed invention.

FIG. 2 shows an alternate embodiment of the invention. The valve is formed without the axially aligned, unidirectional carbon fibers (15). In this case, the braided carbon fiber material (16) forms the structure of the valve. FIG. 2 shows how the braided carbon fibers are "broomed-out" (18) at the head (13). Any voids in this structure would be filled with carbon matrix material (not shown). In another embodiment of this invention, the laminar sheets (23) bonded to the valve face would be omitted.

Figure 3:
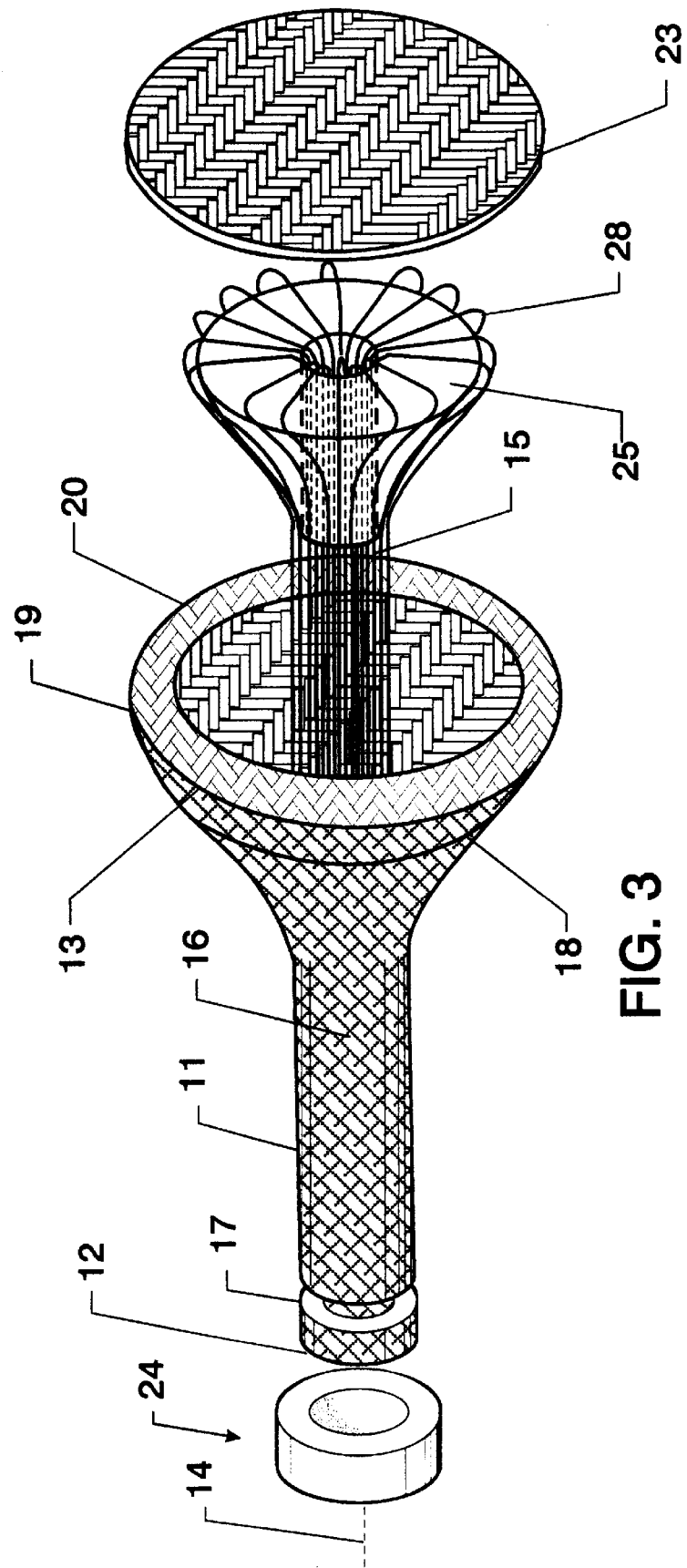
FIG. 3 is an exploded view of some embodiments of the valve fabricated according to the disclosed invention.
Figure 4:
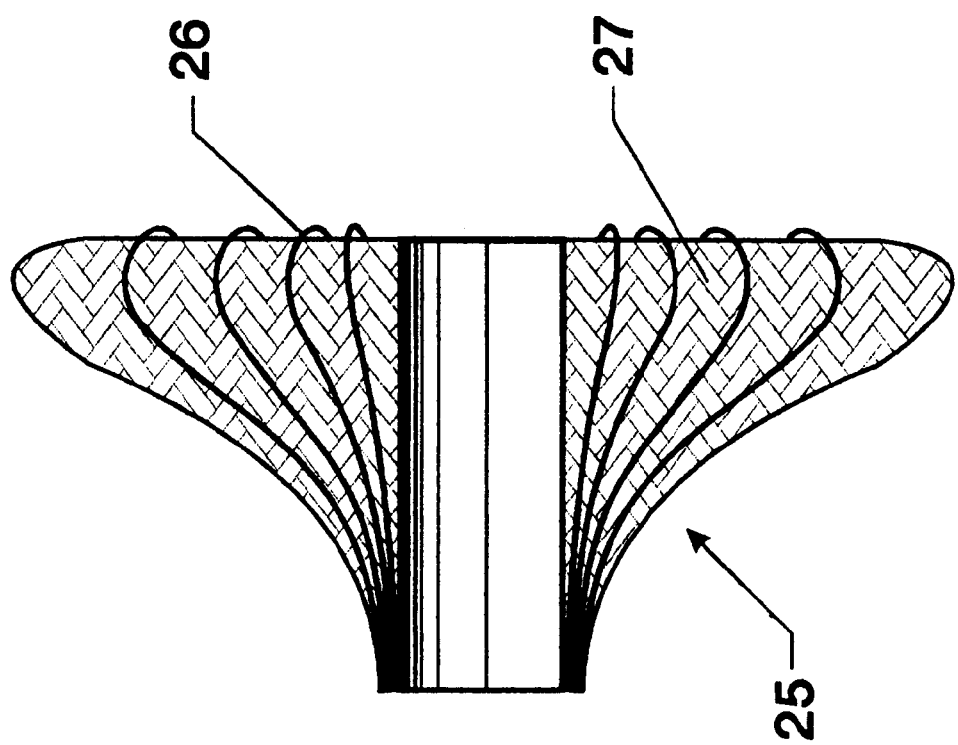
FIG. 4 is a cross-section side view of the plug component according to the disclosed invention.

FIGS. 3 and 4 show another embodiment of this invention. FIG. 3 shows an exploded view of the separate components of the invention. Voids in the valve head (13), where the broomed out carbon fibers (18) are less dense, may be filled by a preformed plug (25). A cross-section view of the plug is shown in FIG. 4. In this embodiment, a plug, composed of carbonaceous matrix material, which may contain continuous (26) or discontinuous (27) carbon fibers, is preformed into the shape of the valve head (18). FIG. 3 shows that after the unidirectional fibers and casing fibers are broomed out, the plug is inserted into the stem and the broomed out fibers evenly distributed over the plug (25), around the plug's outside circumference (28), and then radially back toward the valve's axis (14).

In another embodiment of the invention, additional fibers may be introduced into the unidirectional carbon fibers or the braided carbon fiber casing at the area around the head portion of the valve in order to increase fiber density.

Figure 5:
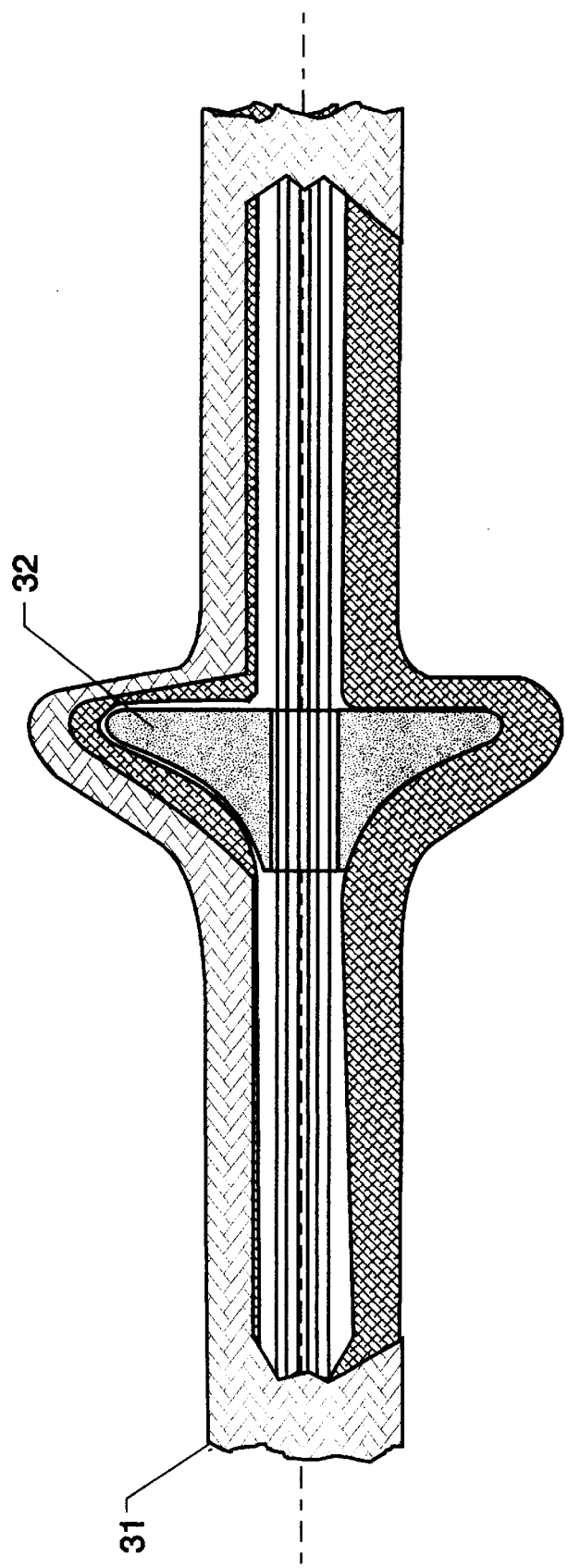
FIG. 5 is a partially sectioned side view of a process for making the valve according to the present invention.

FIG. 5 shows a process for making net-shaped CFRCC valves in a stream of production. The valve contemplated by this invention may be manufactured in quantity. A continuous production of braided carbon fiber rope (31) is formed over a mandrel (32) in the net-shape of the valve head. The mandrel is formed from a carbon matrix plug. The carbon matrix plug may contain continuous or discontinuous carbon fibers. The carbon matrix mandrel (32) is introduced at spaced intervals into the braided carbon fiber rope (31) production stream. From this stream, valve forms are continuously cut and placed in molds (not shown). The carbon fibers used in this process may be preimpregnated with a carbon matrix precursor. The molds are used to introduce any additional material into the net-shape valve and to cure the valve into a finished valve or preform suitable for final machining.

Many improvements, modifications, and additions will be apparent to the skilled artisan without departing from the spirit and scope of the present invention as described herein and defined in the following claims.

What is claimed is:

1. A finished carbon fiber reinforced carbon composite valve comprising:
   a casing having an elongated stem formed from a braided carbon fiber material, said stem having a tip portion at one end, an axis along the center of the stem, and a head portion at the other end,
   said braided carbon fiber material being broomed out at said head portion to form the shape of a valve head and having a valve face, said valve head being suitable for mating with an engine valve seat.

2. A valve according to claim 1 further comprising one or more unidirectional carbon fibers axially aligned along the stem.

3. A valve according to claim 2 wherein said axially aligned unidirectional carbon fibers are broomed out at said head portion along with the broomed out layers of braided carbon fiber material to form said head portion.

4. A valve according to claim 3 wherein said axially aligned unidirectional carbon fibers and said braided carbon fiber material contain more carbon fibers at said head portion than at said tip portion.

5. A valve according to claim 3 wherein said head portion has an outer circumference and said broomed out layers of unidirectional fibers and braided carbon fiber material forming said head portion are bent around said circumference and directed radially toward the axis of the valve.

6. A valve according to claim 5 further comprising a preformed carbon matrix plug having the net-shape of said head portion, said plug being a mandrel over which said axially aligned unidirectional carbon fibers and said braided carbon fiber material are broomed out and bent over the circumference of the head portion and radially directed toward the valve's axis, forming the valve's face.

7. A valve according to claim 3 further comprising a preformed carbon matrix plug having the net-shape of said head portion, said plug being a mandrel over which the axially aligned unidirectional carbon fibers and braided carbon fiber material are broomed out.

8. A valve according to claim 3 further comprising a preformed carbon matrix plug having the net-shape of said head portion and having an axially aligned hole through which at least some of said axially aligned unidirectional carbon fibers pass, and said plug being a mandrel over which at lease some of said axially aligned unidirectional carbon fibers and all of said braided carbon fiber material are broomed out.

9. A valve according to claim 2 further comprising a matrix of carbon in which the braided carbon material casing and the axially aligned unidirectional carbon fibers of the stem and head portion are embedded.

10. A valve according to claim 9 wherein said matrix of carbon contains discontinuous carbon fibers.

11. A valve according to claim 9 further comprising the addition into the matrix of carbon of a magnetic material.

12. A valve according to claim 11 wherein the magnetic material is iron.

13. A valve according to claim 1 wherein said braided carbon fiber material contains more carbon fibers at said head portion than at said tip portion.

14. A valve according to claim 1 further comprising a metallic cap covering said tip portion.

15. A valve according to claim 1 further comprising a preformed carbon matrix plug having the net-shape of said head portion, said plug being a mandrel over which the braided carbon fiber material is broomed out.

16. A valve according to claim 1 further comprising laminar sheets of woven carbon fiber material bonded on the valve face.

17. A valve according to claim 1 further comprising an anti-oxidation treatment applied to the valve.

18. A valve according to claim 17 wherein the anti-oxidation treatment is a coating selected from the group consisting of silicon nitride, silicon carbide and nickel.

19. A valve according to claim 17 wherein the anti-oxidation treatment is impregnation of carbon fibers and carbon matrix material with boron.

20. A valve according to claim 1 wherein said stem has a cylindrical shape.

* * * * *